United States Patent
Abramson et al.

(10) Patent No.: US 7,974,395 B2
(45) Date of Patent: Jul. 5, 2011

(54) DETECTION OF TELEPHONE NUMBER SPOOFING

(75) Inventors: Sandra R. Abramson, Freehold, NJ (US); Stephen M. Milton, Freehold, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1581 days.

(21) Appl. No.: 11/237,537

(22) Filed: Sep. 28, 2005

(65) Prior Publication Data

US 2007/0081648 A1     Apr. 12, 2007

(51) Int. Cl.
*H04M 17/00* (2006.01)
*H04M 15/00* (2006.01)
(52) U.S. Cl. ............... 379/145; 379/114.14; 379/144.03
(58) Field of Classification Search ............... 379/93.02, 379/93.03, 93.04, 93.14, 93.18, 114.14, 142.01, 379/142.03, 142.04, 142.05, 142.06, 156, 379/182, 183, 188, 189, 198, 207.04, 207.11, 379/207.13, 207.15, 210.02, 210.03, 212.01
See application file for complete search history.

(56) References Cited

U.S. PATENT DOCUMENTS

| | | | |
|---|---|---|---|
| 5,081,667 A * | 1/1992 | Drori et al. | 455/404.1 |
| 5,684,869 A * | 11/1997 | Palumbo et al. | 379/182 |
| 5,684,950 A | 11/1997 | Daare | |
| 5,790,646 A * | 8/1998 | Moon | 379/198 |
| 5,889,952 A | 3/1999 | Hunnicutt et al. | |
| 5,974,133 A * | 10/1999 | Fleischer et al. | 379/230 |
| 6,122,631 A | 9/2000 | Berbec et al. | |
| 6,445,783 B1 * | 9/2002 | Creswell et al. | 379/207.13 |
| 6,510,523 B1 | 1/2003 | Perlman et al. | |
| 6,768,792 B2 * | 7/2004 | Brown et al. | 379/207.14 |
| 6,941,552 B1 * | 9/2005 | Beadle et al. | 718/1 |
| 7,200,215 B2 * | 4/2007 | Brown et al. | 379/210.01 |
| 7,336,772 B1 * | 2/2008 | Velusamy | 379/88.17 |
| 7,437,755 B2 * | 10/2008 | Farino et al. | 726/5 |
| 7,616,748 B1 * | 11/2009 | Katz | 379/210.02 |
| 2002/0090073 A1 * | 7/2002 | Heilmann et al. | 379/189 |
| 2002/0181448 A1 | 12/2002 | Uskela et al. | |
| 2002/0184509 A1 | 12/2002 | Scheidt et al. | |
| 2003/0005118 A1 | 1/2003 | Williams | |
| 2004/0034774 A1 | 2/2004 | Le Saint | |
| 2004/0086101 A1 * | 5/2004 | Katz | 379/210.02 |

(Continued)

FOREIGN PATENT DOCUMENTS

CN     1627683 A1     6/2005

(Continued)

OTHER PUBLICATIONS

Hyam, Kristy, "CA Application No. 2,558,616 Office Action Mar. 13, 2009", , Publisher: CIPO, Published in: CA.

(Continued)

*Primary Examiner* — Binh K Tieu
(74) *Attorney, Agent, or Firm* — DeMont & Breyer, LLC

(57) ABSTRACT

An apparatus and method are disclosed that enables detecting the spoofing of a telephone number. To validate the identity of a calling terminal, some techniques in the prior art rely on exchanging data that only the legitimate calling system and the called system know about. In contrast, the illustrative embodiment of the present invention validates the identity of the calling terminal by assessing characteristics other than the calling terminal's telephone number, such as the telephone type and the signaling protocol. By using characteristics other than telephone number to validate the identity, the data-processing system of the illustrative embodiment makes it more difficult to spoof a legitimate telephone's number.

20 Claims, 5 Drawing Sheets

U.S. PATENT DOCUMENTS

| | | | |
|---|---|---|---|
| 2004/0213172 A1 | 10/2004 | Myers et al. | |
| 2005/0021351 A1 | 1/2005 | Koskinen et al. | |
| 2005/0187890 A1 | 8/2005 | Sullivan | |
| 2005/0198534 A1 | 9/2005 | Matta et al. | |
| 2006/0154661 A1* | 7/2006 | Gonen et al. | 455/435.1 |
| 2006/0177035 A1* | 8/2006 | Cope et al. | 379/211.02 |
| 2006/0251230 A1* | 11/2006 | Tischler | 379/156 |
| 2007/0036314 A1* | 2/2007 | Kloberdans et al. | 379/189 |
| 2007/0289006 A1 | 12/2007 | Ramachandran et al. | |

FOREIGN PATENT DOCUMENTS

| | | |
|---|---|---|
| EP | 0720091 A2 | 7/1996 |
| JP | H08-256371 A | 10/1996 |
| JP | 2002132722 A | 5/2002 |
| JP | 2004310581 A | 11/2004 |
| WO | 03102754 A1 | 12/2003 |

OTHER PUBLICATIONS

Nash, Michael, "EP Application No. 06019830.6-2414 Extended Search Report Feb. 13, 2007", , Publisher: EPO, Published in: EP.

Hongo, A., "JP Application No. 2006-266635 Office Action Mar. 10, 2010", , Publisher: JPO, Published in: JP.

Chi Fang, "CN Application No. 200610141558.7 Office Action Oct. 23, 2009", , Publisher: SIPO, Published in: CN.

Chi, Fang, "CN Application No. 200610141558.7 Office Action Apr. 17, 2009", , Publisher: SIPO, Published in: CN.

Alonso Maleta, J., "EP Application No. 06019673 Search Report Feb. 13, 2007", , Publisher: EPO, Published in: EP.

Hongo, A., "JP Application No. 2006-266635 Office Action Aug. 3, 2009", , Publisher: JPO, Published in: JP.

Jacobs, Lashonda T., "U.S. Appl. No. 11/239,494 Office Action Nov. 10, 2008", , Publisher: USPTO, Published in: US.

Jacobs, Lashonda T., "U.S. Appl. No. 11/239,494 Office Action Jun. 2, 2008", , Publisher: USPTO, Published in: US.

Jacobs, Lashonda T., "U.S. Appl. No. 11/239,494 Panel Decision Apr. 9, 2009", , Publisher: USPTO, Published in: US.

Nash, Michael, "EP Application No. 06019830.6 Office Action Nov. 4, 2010", , Publisher: EPO, Published in: EP.

Hongo, A., "JP Application No. 2006-266635 Office Action Sep. 13, 2010", , Publisher: JPO, Published in: JP.

Chi, Fang, "CN Application No. 200610141558.7 Mar. 22, 2011",, Publisher: SIPO, Published in: CN.

* cited by examiner

DETECTION OF TELEPHONE NUMBER SPOOFING

FIELD OF THE INVENTION

The present invention relates to telecommunications in general, and, more particularly, to detecting the spoofing of a telephone number.

BACKGROUND OF THE INVENTION

FIG. 1 depicts a schematic diagram of a telecommunications system in the prior art. Telecommunications system 100 comprises:
  i. telecommunications network 101,
  ii. network telephone 103,
  iii. private branch exchange 105,
  iv. on-premises telephones 106 and 107,
  v. Internet protocol network 108,
  vi Internet protocol telephone 109,
  vii. cellular protocol network 110, and
  viii. cellular telephones 112 and 113,
all of which are interconnected as shown.

Telecommunications network 101 is one of multiple, telecommunications networks that are represented in FIG. 1. Telecommunications network 101 comprises the Public Switched Telephone Network, which is a complex of telecommunications equipment that is owned and operated by different entities throughout the World. In the United States of America, for example, the Public Switched Telephone Network (or "PSTN") comprises an address space that is defined by ten digits, and, therefore, comprises 10 billion unique addresses or "telephone numbers." The public switched telephone networks in other countries are similar.

Network 101 interconnects the other telecommunications networks that include (i) the enterprise network supported by private branch exchange 105, (ii) Internet protocol network 108, and (iii) cellular protocol network 110. The enterprise network supported by private branch exchange 105 provides telecommunications service to one or more telecommunications terminals—for example, telephones 106 and 107—within the enterprise area served, such as an office building or campus. Internet protocol network 108 provides telecommunications service to one or more Internet protocol-capable telecommunications terminals, including telephone 109. Cellular protocol network 110 provides telecommunications service to one or more cellular telecommunications terminals, including telephones 112 and 113.

Additionally, network 101 provides telecommunications service to other telecommunications terminals, such as telephone 103. For example, network 101 is able to route a call that telephone 103 originates to private branch exchange 105.

Internet protocol network 108 is capable of switching incoming calls from network 101 to terminals that are capable of Voice over Internet Protocol (VoIP), such as telephone 109. Network 108 is also capable of handling outgoing calls from VoIP-capable terminals to network 101. Network 108 handles calls that involve telephone 109 via one or more routers.

Cellular protocol network 110 is capable of switching incoming calls from network 101 to cellular-capable terminals that have registered with the network, such as telephones 112 and 113. Network 110 is also capable of handling outgoing calls from cellular-capable terminals to network 101. Network 110 handles calls that involve telephones 112 and 113 via one or more mobile switching centers and radio base stations.

Private branch exchange (PBX) 105 is an enterprise system capable of switching incoming calls (e.g., originated by telephone 113, etc.) from telecommunications network 101 via one or more communications paths to one or more on-premises terminals, such as on-premises telephones 106 and 107. Private branch exchange 105 is also capable of handling outgoing calls from on-premises terminals to network 101 via one or more communications paths.

Private branch exchange 105 is also capable of forwarding an incoming call, such as from telephone 113, to a telephone number of a PBX user's "off-premises" terminal that is accessible through network 101. This type of forwarding to a terminal affiliated with exchange 105 is also known as "extending" a call because the connection to the off-premises terminal appears to exchange 105 as an additional PBX line, or "call appearance." Exchange 105 extends the call to the call appearance at the off-premises terminal in addition to switching the same incoming call to a call appearance at an "on-premises terminal" within the enterprise area that exchange 105 serves. In telecommunications system 100, telephones 106 and 107 are the on-premises terminals with respect to private branch exchange 105, while telephones 103 and 112 are the off-premises terminals with respect to exchange 105. Note that in system 100, telephones 113 and 109 are not considered off-premises terminals because, unlike telephones 103 and 112, they are not affiliated with exchange 105.

To accomplish (i) the switching of an incoming, enterprise-related call to an on-premises terminal and (ii) the extending of the call to the correct off-premises terminal, private branch exchange 105 maintains a table that correlates the off-premises telephone number to the on-premises, private branch exchange extension. Table 1 depicts a table that illustrates the correlation.

TABLE 1

PBX Extension-to-PSTN Number Database

| On-Premises Telephone | Private Branch Exchange Extension | Off-Premises Telephone | Telecommunications Network Number |
|---|---|---|---|
| 106 | 732-555-0102, x11 | 103 | 201-555-1236 |
| 107 | 732-555-0102, x12 | 112 | 908-555-3381 |
| ... | ... | | ... |

In addition, private branch exchange 105 is capable of receiving an incoming call attempt from an off-premises terminal, such as from telephone 103 or 112, in which the call attempt is for accessing one or more PBX user features. Note that outside of the enterprise network, only those terminals that are affiliated with exchange 105 (i.e., telephones 103 and 112) are intended to have access to the user features. In handling the call attempt, network 101 passes to exchange 105 the caller identifier that represents the calling, off-premises terminal. Exchange 105 checks that the caller identifier matches with one that is stored (e.g., 908-555-3381, etc.) and, as a result, grants the PBX user at the off-premises terminal the privilege to access one or more features.

The problem with exchange 105 relying on the caller identifier of the calling terminal is that a telephone user who is using a bogus telephone can masquerade as the legitimate PBX user by manipulating (i) the bogus telephone or (ii) the calling network, or both, to represent the bogus telephone as the legitimate one. This was not a major concern when telecommunications networks were somewhat closed systems that were not easily compromised. However, with the advent of broadband telephone services (e.g., Vonage, AT&T Call- Vantage, etc.) that coexist with the Internet, it has become easier for hackers to manipulate telecommunications networks for unethical or unlawful purposes, such as to "spoof" the caller identifier of a legitimate calling party. For example, a user of a VoIP telephone in certain broadband telephone networks, such as telephone 109 in Internet protocol network 108, is able to use a three-way calling feature to manipulate the value of the VoIP telephone's caller identifier. If the user of a bogus telephone takes on the number of a legitimate user of exchange 105, the bogus user becomes able to access features that are reserved only for legitimate, off-premises users. Access by illegitimate users enables breaking into voice mail accounts and the calling of legitimate PBX users for gathering proprietary information. To minimize this unwanted activity, what is needed is a way to detect the spoofing of a telephone number, without some of the disadvantages of the prior art.

SUMMARY OF THE INVENTION

The present invention enables detecting the spoofing of a telephone number. To validate the identity of a calling terminal, some techniques in the prior art rely on exchanging data that only the legitimate calling system and the called system know about. In contrast, the illustrative embodiment of the present invention validates the identity of the calling terminal by assessing characteristics other than the calling terminal's telephone number, such as the telephone type and the signaling protocol. By using characteristics other than telephone number to validate the identity, the data-processing system of the illustrative embodiment makes it more difficult to spoof a legitimate telephone's number.

In accordance with the illustrative embodiment, the data-processing system that receives a call attempt from a calling telephone (i.e., through one or more telecommunications networks) also receives the calling phone's telephone number, along with other information that is pertinent to the telephone. The data-processing system, such as an enhanced private branch exchange, first checks the telephone number to determine if it matches a number that belongs to a user of the data-processing system. In accordance with the illustrative embodiment, the data-processing system then checks the calling telephone's telephone type that the system receives with the telephone number to see if the telephone type agrees with what is expected for the matched telephone number. The system also checks the signaling protocol used by the calling telephone in attempting the call, also to see if the signaling protocol agrees with what is expected. Finally, in some embodiments, the system checks the order of the identifiers present in the call attempt message to see if the order agrees with what is expected. By checking the results, the data-processing system determines, with a higher level of confidence than with some techniques in the prior art, whether the calling telephone is genuine or is spoofing another telephone.

The illustrative embodiment of the present invention is different from some verification techniques in the prior art, in that it does not rely on the actual value of the calling identifier. Rather, it relies on the characteristics of the calling telephone and on the messages used to convey the call attempt information. The illustrative embodiment is advantageous over some techniques in the prior art because of the inherent level of difficulty for a hacker to determine the exact values of esoteric parameters such as the telephone type of and the signaling protocol used by the calling telephone. For example, it is relatively straightforward for a hacker to apply a spoofed calling number to a call attempt. In contrast, it is considerably more difficult to (i) determine the one or more alternative characteristics that are checked by the system targeted by the hacker, (ii) understand the values of the relevant characteristics for the particular phone being spoofed, and (iii) identify and insert the specific numerical quantities in the correct fields in the call attempt messages.

The illustrative embodiment of the present invention comprises: receiving a telephone number and a telephone type for a first telephone; and granting a privilege to the first telephone based on whether or not the telephone type agrees with what is expected for the telephone number.

DETAILED DESCRIPTION

The terms appearing below are given the following definitions for use in this Description and the appended Claims.

For the purposes of this specification and claims, the term "telephone type" refers to the type of the calling telecommunications terminal. The telephone type of each telephone is based on one or more properties of the telephone, wherein each possible value of telephone type represents a specific combination of values of those properties. The properties include, but are not limited to, the following:

i. the location of the telephone (e.g., home, work, car, etc.);
ii. the capability of the telephone (e.g., voice, video, data, facsimile, pager, etc.);
iii. the transmission media used by the telephone (e.g., wireless, Code-Division Multiple Access [CDMA], Global System for Mobile Communications [GSM], wireline, etc.);
iv. the network transmission protocol used by the telephone (e.g., Internet protocol, Integrated Services Digital Network [ISDN], analog, etc.);
v. the manufacturer (e.g., Avaya, Motorola, Nokia, Cisco, etc.); and
vi. the service provider (e.g., Verizon, Vonage, AT&T, SBC, etc.).

As those who are skilled in the art will appreciate, telecommunications terminals can be characterized by a telephone type that is based on other properties than those listed above.

For the purposes of this specification and claims, the term "signaling protocol" is defined as the agreed-upon format for transmitting data between two devices. Unless otherwise specified, the signaling protocol of the calling telephone refers to the format for transmitting data in the attempting of a call between the calling telephone and the calling network. The signaling protocol represented might refer to a broad set of protocols (e.g., ISDN, etc.) or it might refer to a specific layer, or subset, within the protocol set (e.g., Q.931, etc.).

Figure 2:
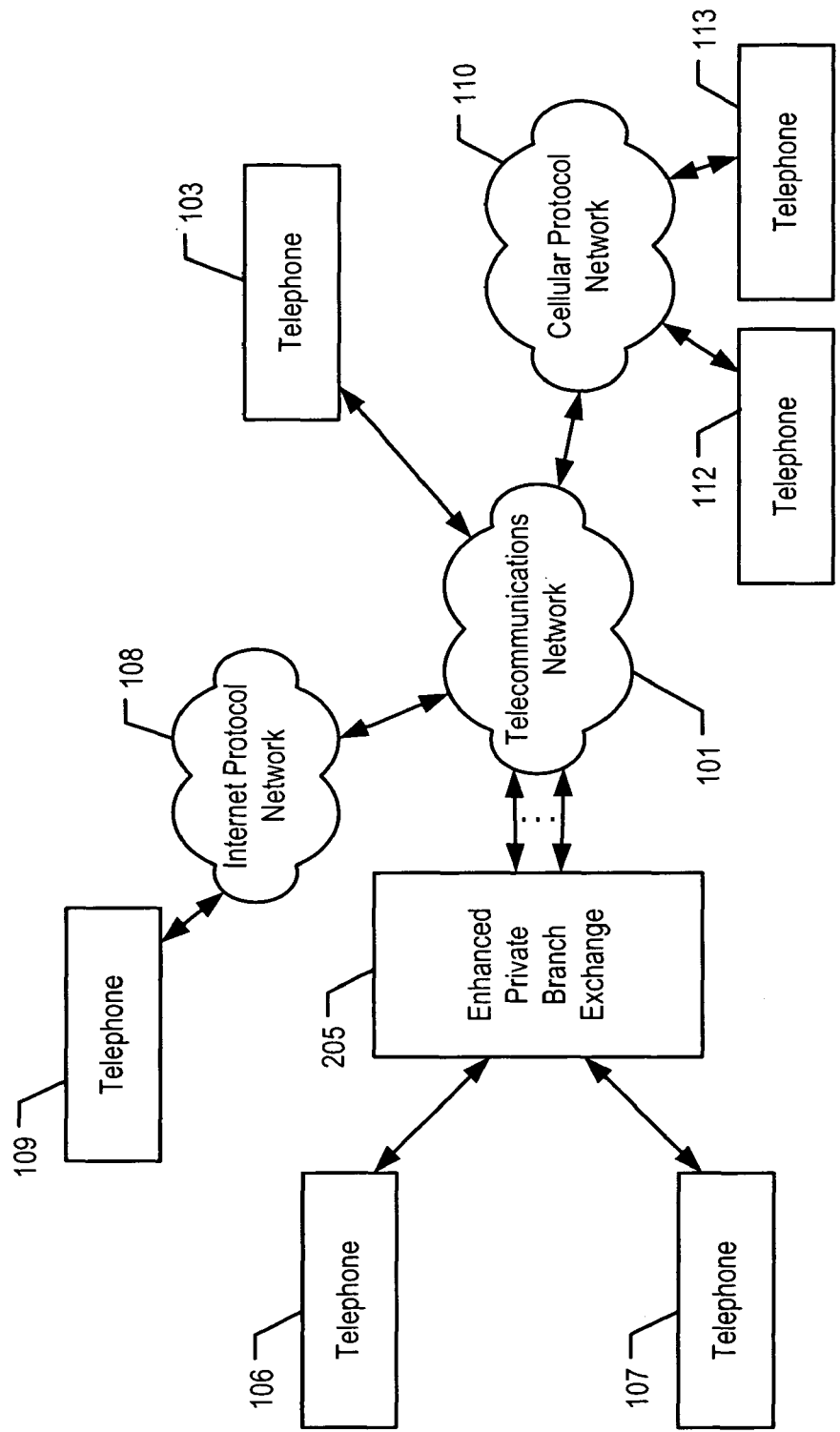
FIG. 2 depicts a schematic diagram of telecommunications system 200, in accordance with the illustrative embodiment of the present invention.

FIG. 2 depicts a schematic diagram of a telecommunications system, in accordance with the illustrative embodiment of the present invention. Telecommunications system 200 comprises:

i. telecommunications network 101,
    ii. network telephone 103,
    iii. enhanced private branch exchange 205,
    iv. on-premises telephones 106 and 107,
    v. Internet protocol network 108,
    vi Internet protocol telephone 109,
    vii. cellular protocol network 110, and
    viii. cellular telephones 112 and 113, all of which are interconnected as shown.

Figure 1:
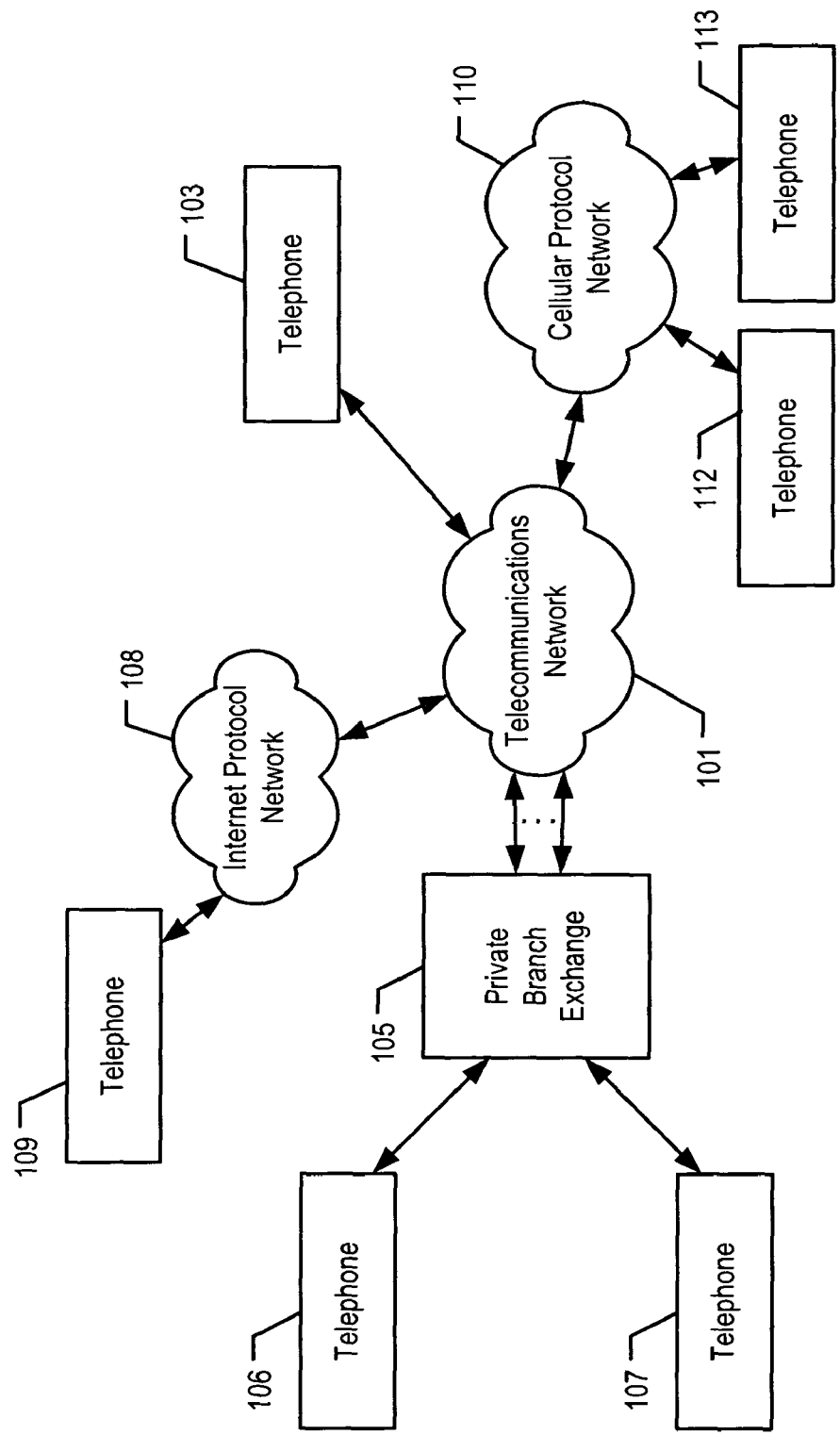
FIG. 1 depicts a schematic diagram of telecommunications system 100 in the prior art.

All of the elements depicted in FIG. 2—with the exception of enhanced private branch exchange 205—are described above and with respect to FIG. 1.

Enhanced private branch exchange 205 is a data-processing system, the salient components of which are described below and with respect to FIG. 3. Enhanced private branch exchange 205 is capable of switching incoming calls (e.g., from telephone 103, etc.) from network 101 via one or more communications paths to on-premises terminals, such as telephones 106 and 107. Exchange 205 is also capable of handling outgoing calls from on-premises terminals to network 101 via one or more communications paths.

Enhanced private branch exchange 205 is also capable of extending an incoming call (e.g., from telephone 103, etc.) to a telephone number of an off-premises terminal. From exchange 205's perspective, an "off-premises" terminal is a terminal that is accessible through network 101 while still being affiliated with exchange 205 as an extension to exchange 205's enterprise network. For pedagogical purposes, telephones 103 and 112 are the off-premises terminals in telecommunications system 200. Exchange 205 is capable of extending the incoming call to the intended off-premises terminal in addition to or independently of switching the same incoming call to an on-premises terminal within the enterprise area that exchange 205 serves.

In addition, enhanced private branch exchange 205 is capable of receiving an incoming call attempt from an off-premises terminal, such as from telephone 103 or 112, in which the call attempt is for accessing one or more PBX user features. Note that these user features are available outside of the enterprise network to only those terminals that are affiliated with exchange 205 (i.e., telephones 103 and 112).

Enhanced private branch exchange 205 is connected to telecommunications systems that are present in network 101 via communications paths that comprise Integrated Services Digital Network (ISDN) trunks, as are known in the art. As those who are skilled in the art will appreciate, other types of communications paths might connect exchange 205 to network 101. For example, exchange 205 might receive at least some of the incoming calls via the Session Initiation Protocol over an Internet Protocol-based network.

It will be clear to those skilled in the art, after reading this disclosure, how to make and use alternative embodiments of the present invention in which enhanced private branch exchange 205 provides telecommunications service to a different number of on-premises terminals and a different number of off-premises terminals than those depicted. It will also be clear to those skilled in the art, after reading this disclosure, how to make and use alternative embodiments of the present invention in which exchange 205—or another data-processing system that operates in accordance with the illustrative embodiment—provides service to telecommunications terminals other than telephones (e.g., handheld personal computers, etc.).

Enhanced private branch exchange 205 is also capable of performing the tasks described below and with respect to FIG. 4, in accordance with the illustrative embodiment. It will be clear to those skilled in the art, after reading this disclosure, how to make and use enhanced private branch exchange 205. Moreover, as those who are skilled in the art will appreciate, there can be alternative embodiments of the present invention in which a central office switch, contact center, or other type of data-processing system than a private branch exchange performs the described tasks. The data-processing systems in those alternative embodiments can inter-operate with the Public Switched Telephone Network that constitutes network 101. In some other alternative embodiments, those data-processing systems—or exchange 205, for that matter—can inter-operate with another type of network entirely (e.g., an Internet Protocol-based network, a wireless network, etc.). Putting it differently, the present invention is well suited for implementation in variety of networks: in public and private telecommunications networks, in circuit-switched and packet-switched networks, in wireline and wireless networks, and so forth.

Figure 3:
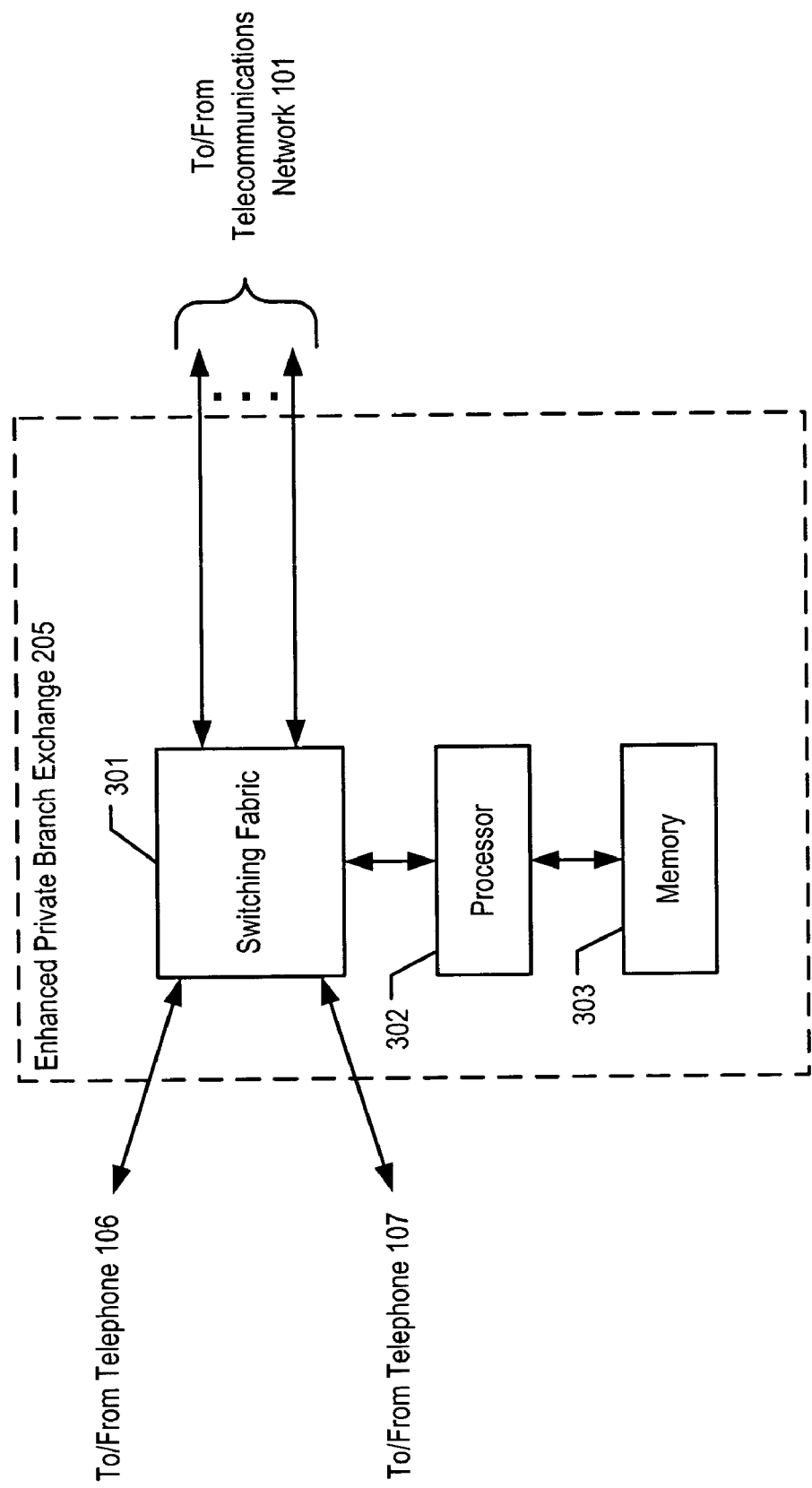
FIG. 3 depicts a block diagram of the salient components of enhanced private branch exchange 205 in accordance with the illustrative embodiment of the present invention.

FIG. 3 depicts a block diagram of the salient components of enhanced private branch exchange 205 in accordance with the illustrative embodiment of the present invention. Enhanced private branch exchange 205 comprises switching fabric 301, processor 302, and memory 303, interconnected as shown.

Switching fabric 301 is capable of switching calls between on-premises terminals (e.g., telephones 106 and 107, etc.), and terminals that are accessible through network 101. In addition, switching fabric 301 is capable of performing the tasks described below and with respect to FIG. 4, under the direction of processor 302. It will be clear to those skilled in the art how to make and use switching fabric 301.

Processor 302 is a general-purpose processor that is capable of receiving called-related data from switching fabric 301, of reading data from and writing data to memory 303, and of executing the tasks described below and with respect to FIG. 4. In some alternative embodiments of the present invention, processor 302 might be a special-purpose processor. In either case, it will be clear to those skilled in the art, after reading this disclosure, how to make and use processor 302.

Memory 303 is a non-volatile random-access memory that stores the instructions and data used by processor 302. Memory 303 stores the PBX on-premises extension and affiliated off-premises telephone number for each PBX user, which are shown in Table 1. Memory 303 also stores the expected values of the characteristics for each off-premises telephone number, as described below and illustrated in Table 2. It will be clear to those skilled in the art how to make and use memory 303.

Figure 4:
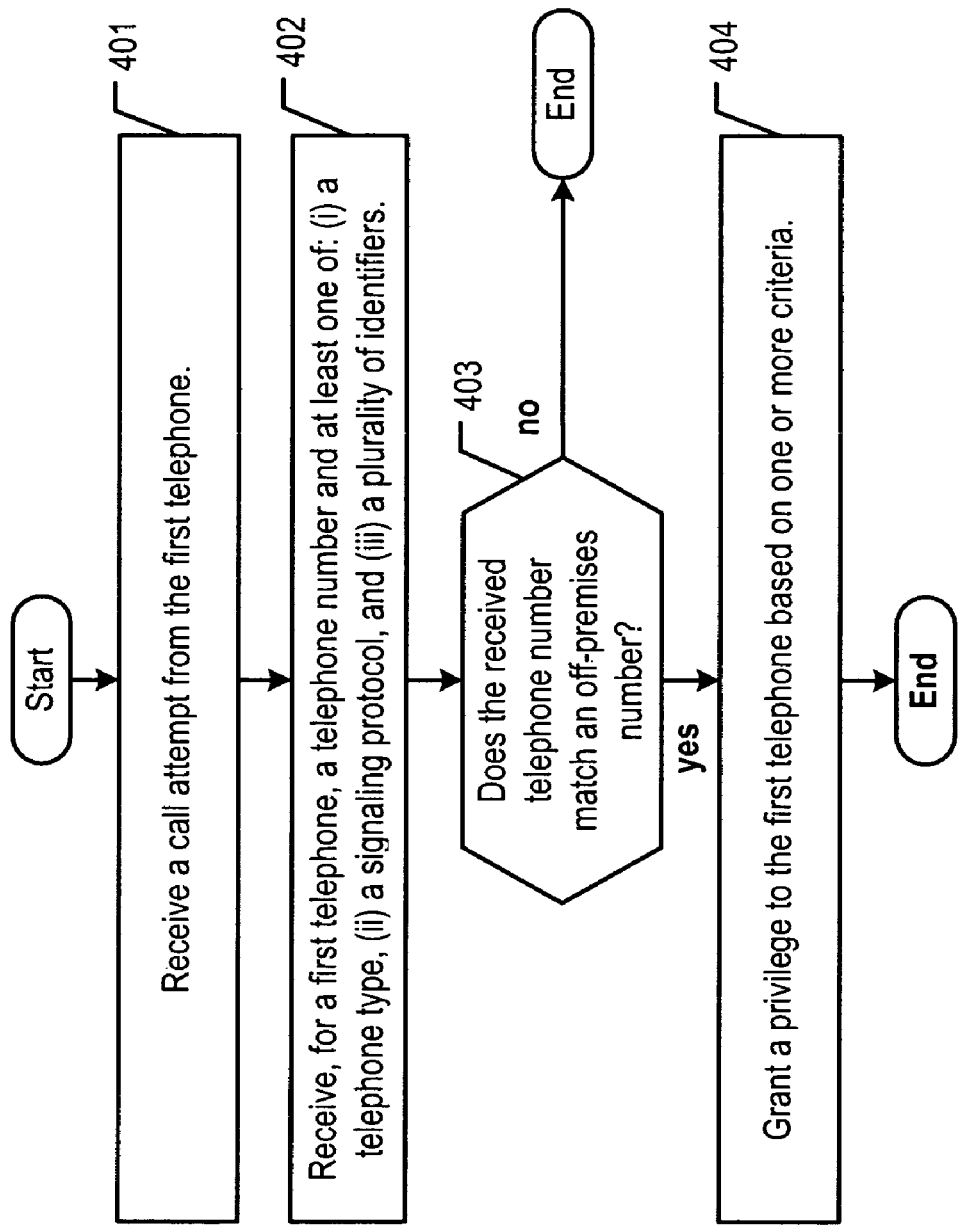
FIG. 4 depicts a flowchart of the operation of enhanced private branch exchange 205 when handling a call attempt from a calling telephone, in accordance with the illustrative embodiment of the present invention.

FIG. 4 depicts a flowchart of the operation of enhanced private branch exchange 205, in accordance with the illustrative embodiment of the present invention. Exchange 205 receives information that is related to a calling telephone and determines whether to grant the calling telephone a privilege (e.g., establishing a call with exchange 205, etc.). It will be clear to those skilled in the art which tasks depicted in FIG. 4 can be performed simultaneously or in a different order than that depicted.

At task 401, exchange 205 receives a call attempt from a first, calling telephone, in well-known fashion. In some alternative embodiments, exchange 205 instead receives an initialization of a transaction of data (e.g., email messages, instant messaging messages, etc.) to follow.

At task 402, exchange 205 receives a telephone number for the first telephone. The telephone number is a caller identifier, as is known in the art. In some alternative embodiments, exchange 205 receives some other type of identifier that identifies the calling (originating) party. Exchange 205 also receives one or both of (i) a telephone type and (ii) a signaling protocol. The telephone type is that of the calling telephone. For example, the telephone type might be based on the transmission media that the phone uses, in which case, the possible values for telephone type might represent "GSM," "CDMA," "Landline," and so forth. The signaling protocol is that which the calling telephone uses to place the call attempt. For example, the signaling protocol might have possible values that represent "ISDN," "SIP" (for "Session Initiation Protocol"), and so forth. It will be clear to those skilled in the art how the telephone type and the signaling protocol are transmitted from the calling network to exchange 205. In some embodiments, exchange 205 receives a plurality of identifiers that identifies the first telephone, wherein the plurality of identifiers comprises the telephone number.

At task 403, exchange 205 checks if the received telephone number matches any off-premises telephone number that is stored in memory 303. If so, the received telephone number might be that of a user and task execution proceeds to task 404 for verification. If not, the received telephone number is not of any user of exchange 205 and task execution ends.

At task 404, exchange 205 grants a privilege to the first telephone based on one or more criteria that exchange 205 uses to verify the identity of the first telephone. Task 404 is described in detail below and with respect to FIG. 5. Task execution then ends after task 404.

Figure 5:
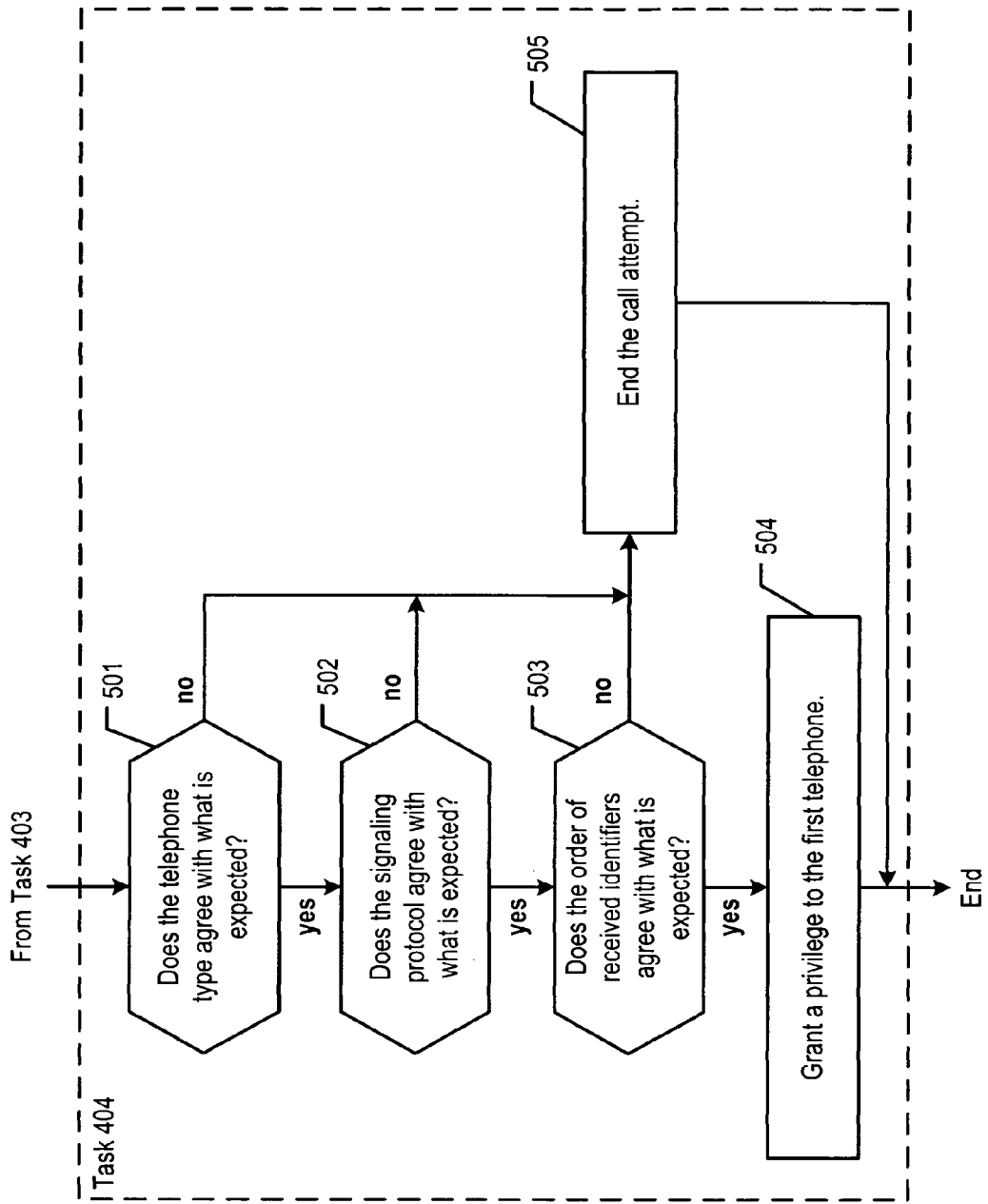
FIG. 5 depicts a flowchart of the tasks that are related to task 404, in accordance with the illustrative embodiment of the present invention.

FIG. 5 depicts a flowchart of the salient tasks that are related to task 404, in accordance with the illustrative embodiment of the present invention. In some alternative embodiments, as those who are skilled in the art will appreciate, other criteria than those described can be used to verify the identity of the first telephone. It will be clear to those skilled in the art which tasks depicted in FIG. 5 can be performed simultaneously or in a different order than that depicted.

At task 501, exchange 205 determines whether the received telephone type agrees with what is expected for the received telephone number. If the telephone type agrees with what is expected, task execution proceeds to task 502; otherwise, task execution proceeds to task 505.

Exchange 205 has expected information for each affiliated telephone number stored in memory 303. Table 2 depicts an example of the type of information stored.

TABLE 2

Telephone Characteristics Database

| Off-Premises Telephone | Telecommunications Network Number | Telephone Type | Signaling Protocol |
|---|---|---|---|
| 103 | 201-555-1236 | Landline | ISDN |
| 112 | 908-555-3381 | GSM Cellular | ISDN |
| ... | ... | ... | ... |

For example, for the telephone number "908-555-3381", exchange 205 expects a telephone type of "GSM Cellular". If the calling telephone's telephone type is "GSM Cellular", then task execution proceeds to task 502. If the calling telephone's telephone type is something else, such as "Landline", then task execution proceeds to task 505.

At task 502, exchange 205 determines whether the received signaling protocol agrees with what is expected for the received telephone number. If the signaling protocol agrees with what is expected, then task execution proceeds to task 503; otherwise, task execution proceeds to task 505.

For example, for the telephone number "908-555-3381" as shown in Table 2, exchange 205 expects the calling telephone to be using a signaling protocol of "ISDN". If the calling telephone is using a signaling protocol of "ISDN", then task execution proceeds to task 503; otherwise, task execution proceeds to task 505.

At task 503, exchange 205 determines whether the ordering of the identifiers within the received plurality of identifiers agrees with what is expected for the received telephone number. If the ordering of the identifiers agrees with what is expected, then task execution proceeds to task 504; otherwise, task execution proceeds to task 505.

For example, suppose exchange 205 expects four identifiers A through D in the order "A-B-C-D" in the signaling message. If exchange 205 receives the four identifiers, but in the order "A-B-D-C" (i.e., not in the order expected), then task execution proceeds to task 505.

At task 504, exchange 205 grants one or more privileges to the calling telephone, having validated the identity of the calling telephone in tasks 501 through 503. In accordance with the illustrative embodiment, the calling telephone has indicated, as part of the call attempt, the privilege that it wants. In some alternative embodiments, however, exchange 205 determines the privilege to grant to the calling telephone. The privilege, for example, might comprise establishing a call with exchange 205 or with another data-processing system. The privilege might further comprise calling a second telephone (e.g., telephone 103, etc.) through exchange 205. Alternatively, the privilege might be to access one or more user features at exchange 205. After task 504, task execution ends.

At task 505, exchange 205, having received at least one unexpected value for the received telephone number, ends the call attempt from the first telephone. Task execution then ends.

As described with respect to FIG. 5 and in accordance with the illustrative embodiment, exchange 205 will not grant privileges if the result of any check—that of telephone type, for example—is unexpected. In some alternative embodiments, however, exchange 205 might still grant privileges, or a limited set of privileges, even if at least one of the results is unexpected, indeterminate, or unknown—for example, the received telephone type is unexpected but the received signaling protocol is as expected. Furthermore, in some other alternative embodiments, exchange 205 might not check the three characteristics of telephone type, signaling protocol, and the ordering of the identifiers; instead, it might check only one or two of those characteristics.

Two examples are now presented to explain further the operation of exchange 205. The first example is of an off-premises terminal, telephone 112, attempting a call to enhanced private branch exchange 205. The second example is of a spoofing terminal, telephone 109, attempting a call to exchange. 205.

In the first example, the user of telephone 112, who is a legitimate user of exchange 205, wishes to access one or more features at exchange 205 and, to that end, attempts a call to exchange 205. Exchange 205 receives the call attempt, along with the telephone number (908-555-3381), telephone type (GSM Cellular), and signaling protocol (ISDN). Exchange 205 first verifies that the telephone number matches a number of a valid PBX user. Exchange 205 then checks the telephone type and signaling protocol and verifies that they match with the expected values. The identifier information has also arrived in the correct ordering. Therefore, exchange 205 determines that the calling telephone is valid and grants the telephone the one or more privileges that it is attempting to access.

In the second example, the user of landline telephone 109 is attempting to hack into exchange 205 to access illegitimately one or more features. The user attempts a call to exchange 205, manipulating the terminal and infrastructure to send a spoofed calling party number, such as telephone 112's number (i.e., "908-555-3381"), to exchange 205. As those who are skilled in the art will appreciate, some voice over Internet protocol networks do not prevent the sending of a spoofed telephone number as the calling number. Exchange 205 receives the call attempt, along with the telephone number (908-555-3381), telephone type, and signaling protocol. Exchange 205 first verifies that the telephone number matches a number of a valid PBX user, in well-known fashion. Exchange 205 then checks the telephone type and determines that instead of being "GSM Cellular", the received telephone type is actually "Landline". Having determined that the calling telephone is bogus, exchange 205 consequently does not grant the spoofing terminal any privileges and ends the call attempt.

It is to be understood that the above-described embodiments are merely illustrative of the present invention and that many variations of the above-described embodiments can be devised by those skilled in the art without departing from the scope of the invention. For example, in this Disclosure, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the disclosure to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Disclosure are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   receiving, at a data-processing system from a calling telephone, a telephone number of the calling telephone and an indication of a telephone type of the calling telephone; and
   granting a privilege to the calling telephone, wherein the granting of the privilege is based on whether the telephone type of the calling telephone agrees with what is expected for the telephone number of the calling telephone.

2. The method of claim 1 wherein the privilege comprises establishing a call with the data-processing system.

3. The method of claim 2 wherein the privilege further comprises calling a second telephone through the data-processing system.

4. The method of claim 3 wherein the data-processing system is a private branch exchange, and wherein the second telephone is off-premises in relation to the private branch exchange.

5. The method of claim 1 further comprising:
   receiving a call attempt from the calling telephone; and
   ending the call attempt when the telephone type is different from what is expected for the telephone number.

6. The method of claim 1 wherein the calling telephone is an Internet Protocol-capable telephone.

7. The method of claim 1 wherein the granting of the privilege is also based on the signaling protocol that the calling telephone uses to originate a call.

8. A method comprising:
   receiving, at a data-processing system, a telephone number of and an indication of a signaling protocol for a calling telephone, wherein the calling telephone uses the signaling protocol for call origination; and
   granting a privilege to the calling telephone, wherein the granting of the privilege is based on whether the signaling protocol used by the calling telephone for call origination agrees with what is expected for the telephone number of the calling telephone.

9. The method of claim 8 wherein the privilege comprises establishing a call with the data-processing system.

10. The method of claim 9 wherein the privilege further comprises calling a second telephone through the data-processing system.

11. The method of claim 10 wherein the data-processing system is a private branch exchange, and wherein the second telephone is off-premises in relation to the private branch exchange.

12. The method of claim 8 further comprising:
    receiving a call attempt from the calling telephone; and
    ending the call attempt when the signaling protocol is different from what is expected for the telephone number.

13. The method of claim 8 wherein the signaling protocol is based on a protocol other than the Integrated Services Digital Network protocol set.

14. The method of claim 8 wherein the granting of the privilege is also based on the telephone type of the calling telephone.

15. A method comprising:
    receiving, at a data-processing system, a plurality of identifiers that identifies a calling telephone, wherein the plurality of identifiers comprises a telephone number of the calling telephone; and
    granting a privilege to the calling telephone, wherein the granting of the privilege is based on whether the ordering of the identifiers within the plurality that identifies the calling telephone agrees with what is expected for the telephone number of the calling telephone.

16. The method of claim 15 wherein the privilege comprises establishing a call with the data-processing system.

17. The method of claim 16 wherein the privilege further comprises calling a second telephone through the data-processing system.

18. The method of claim 17 wherein the data-processing system is a private branch exchange, and wherein the second telephone is off-premises in relation to the private branch exchange.

19. The method of claim 15 further comprising:
    receiving a call attempt from the calling telephone; and
    ending the call attempt when the ordering of the identifiers within the plurality is different from what is expected for the telephone number.

20. The method of claim 15 wherein the granting of the privilege is also based on a signaling protocol that is associated with the calling telephone.

* * * * *